United States Patent [19]
Locker et al.

[11] Patent Number: 6,077,483
[45] Date of Patent: Jun. 20, 2000

[54] COATED CATALYTIC CONVERTER SUBSTRATES AND MOUNTS

[75] Inventors: Robert J. Locker, Corning; Constance B. Sawyer, Lindley; Martin J. Schad, Painted Post, all of N.Y.

[73] Assignee: Corning Incorporated, Corning, N.Y.

[21] Appl. No.: 09/089,574

[22] Filed: Jun. 3, 1998

Related U.S. Application Data

[60] Provisional application No. 60/049,557, Jun. 13, 1997.

[51] Int. Cl.[7] .......................................................... B01J 8/02
[52] U.S. Cl. .......................... 422/179; 422/180; 422/221
[58] Field of Search ..................................... 422/179, 221, 422/180, 171, 177; 428/116; 106/DIG. 3, DIG. 4, 18.11

[56] References Cited

U.S. PATENT DOCUMENTS

| | | | |
|---|---|---|---|
| 3,916,057 | 10/1975 | Hatch et al. | 422/179 |
| 4,863,700 | 9/1989 | Ten Eyck | 422/179 |
| 5,376,341 | 12/1994 | Gulati | 422/179 |

FOREIGN PATENT DOCUMENTS 0 396 331   11/1990   European Pat. Off. .

OTHER PUBLICATIONS

SAE Paper No. 952414, Locker et al 1995.
SAE Paper No. 960563, Locker et al 1996.

*Primary Examiner*—Hien Tran
*Attorney, Agent, or Firm*—Kees van der Sterre

[57] ABSTRACT

Ceramic honeycombs used as catalyst supports for combustion engine exhaust pollution control are provided with insulating porous refractory thermal barrier coatings disposed on and bonded to at least a portion of the external skins of the honeycombs, reducing the outer barrier coating surface temperature to provide thermal protection for the resilient fiber support materials used to mount the supports in catalytic converter enclosures.

10 Claims, 2 Drawing Sheets

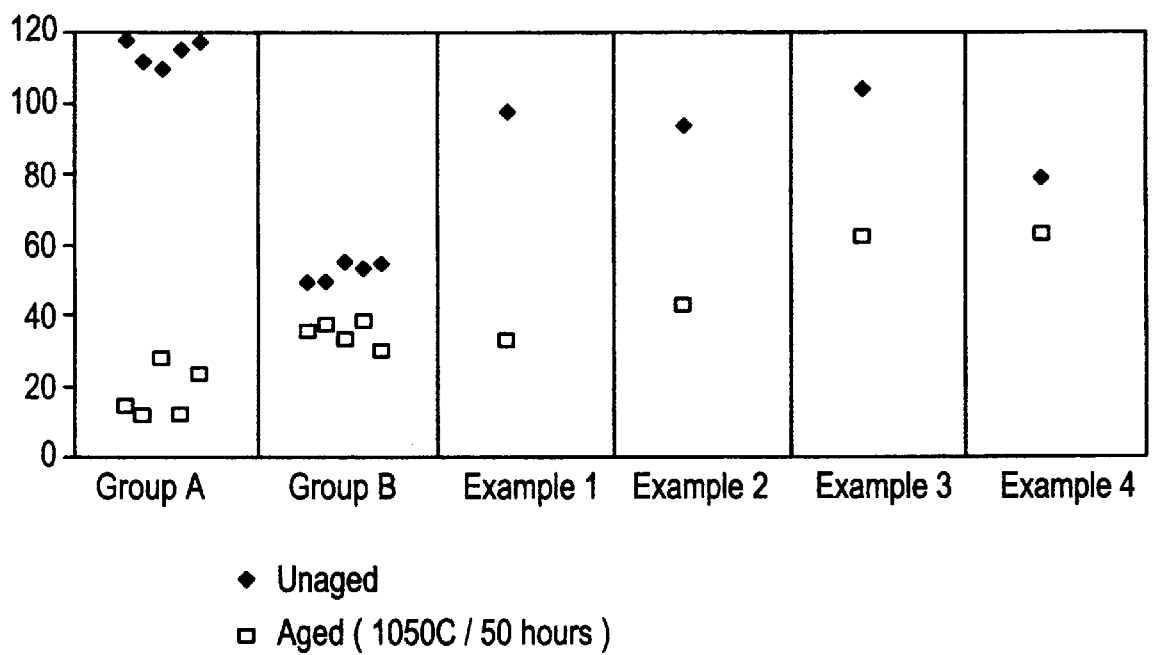

COATED CATALYTIC CONVERTER SUBSTRATES AND MOUNTS

This application claims the benefit of U.S. Provisional Application No. 60/049,557 filed Jun. 13, 1997, entitled "Coated Catalytic Converter Substrates and Mounts", by Robert J. Locker, Constance B. Sawyer and Martin J. Schad.

BACKGROUND OF THE INVENTION

The present invention relates to catalytic converters useful for the treatment of combustion exhaust emissions from internal combustion engines. More particularly, the invention relates to improved honeycomb catalyst supports, and a support system for mounting them, which provides a mounted converter system with excellent resistance to high temperature thermal damage, and to shock and vibration damage, at reduced cost and with reduced mount complexity.

A continuing problem encountered in the development of mounting systems for catalytic converters relates to the temperature stability of the mounting. This problem is particularly severe in so-called "close-coupled" catalytic converters, sometimes referred to as pre-converters, which are typically located very near to the engine in the engine exhaust system. This proximity to the engine exposes the catalyst, ceramic honeycomb substrate, and converter mounting system to significantly higher exhaust temperatures and vibrational loads than are encountered by converters in more conventional automotive underbody locations.

Customarily, intumescent mats have been used as essential mounting materials for supporting ceramic substrate catalytic converter in metal enclosures or "cans". These mats are composed of mineral constituents selected so that, as mat temperatures increase during first use, the mat expands and thereby secures the substrate in the converter can. The use of intumescent mat mounting materials alone and with other fiber mat materials to restrain ceramic honeycombs within metal converter enclosures is described, for example, in U.S. Pat. Nos. 4,863,700 to Ten Eyck and 5,376,341 to Gulati.

Disadvantageously, conventional intumescent mat materials tend to degrade at temperatures above about 700° C. With this degradation, the retention pressure exerted by the mat on the substrate decreases and the potential for axial substrate movement under exhaust backpressure, and eventual failure of the mounting system, increases. In the severe thermal and vibrational environment of the automotive exhaust pre-converter, thermal degradation of the mat becomes an increasingly serious concern.

Discussions of these mounting problems are presented in SAE Paper No. 952414 and SAE Paper No. 960563. In general, the experiments detailed in these papers indicate that the residual shear strength of conventional mat mount systems decreases dramatically at environment temperatures in the 950° C. to 1050° C. range. Between 1000° C. and 1050° C. the residual shear strength can fall below accepted minimum strength levels, levels which should provide a safety factor 3 to 4 times the calculated pressure (15 kPa) required to cause axial substrate displacement in a hot (950° C.) high-acceleration (75g) vibration environment. In addition to thermal problems, the mechanical degradation of mat mounting materials under these vibration conditions can also be expected.

SUMMARY OF THE INVENTION

The objective of the present invention is to improve converter mount durability at high temperatures through the use of a thermal barrier coating on the ceramic substrate. The approach is to reduce mat temperature by applying an insulative coating over the substrate outer skin, thereby reducing heat flow to the mat. Heat reduction may occur both by distancing the mat from the hot substrate outer skin, and by reducing radiative and conductive heat transfer from the skin due to the insulative character of the coating.

In addition to the observed reduction in mat temperature, these coatings may also correct problems of out-of-round dimensions in cylindrical substrates, and can enhance substrate crush strength, particularly as honeycomb designs providing higher cell counts and thinner cell partition walls are being adopted by industry.

In a first aspect, then, the invention comprises a unitary barrier-coated ceramic honeycomb body comprising a honeycomb support integrally incorporating a thermal barrier coating on the outer cylindrical surfaces thereof. The support is a low expansion ceramic honeycomb support, generally of the kind useful for the support of catalysts in harsh chemical environments such as the environment of the automobile exhaust.

The thermal barrier coating disposed on the outer cylindrical surfaces of the support comprises an adherent porous refractory ceramic layer, the term "ceramic" being used herein in its broadest sense to encompass glass, semicrystalline ceramics such as glass-ceramics, and conventional crystalline ceramics essentially free of glassy phases. The porous glass, glass-ceramic or ceramic layer, typically having a thermal conductivity lower than that of the honeycomb support, will be of sufficient thickness and porosity to significantly reduce the skin temperature of the barrier-coated body below the skin temperature of the honeycomb support absent the coating, when maintained at an equivalent honeycomb temperature.

By a significant reduction in skin temperature is meant a skin temperature reduction of at least about 50° C. at a honeycomb temperature of approximately 950° C. Such a reduction is readily attainable employing porous ceramic barrier coatings having bulk densities not exceeding about 2.0 g/cm$^3$ and thicknesses of at least about 1 mm.

In a second aspect, the invention comprises a mounted catalyst support assembly, that assembly comprising a ceramic honeycomb body incorporating a plurality of through-channels bounded by an external skin, and an insulating porous refractory ceramic coating integral with the body and bonded to all or portions of the external skin. The assembly further includes an enclosure comprising a metal wall for the support of the coated honeycomb body within the enclosure, and at least one layer of an inorganic intumescent material disposed between the porous refractory ceramic coating and the metal wall. This assembly provides excellent physical protection for the ceramic substrate, while at the same time protecting the intumescent material from thermal damage and loss of retention strength, as hereinafter more fully described.

DESCRIPTION OF THE DRAWING

The invention may be further understood by reference to the drawing, wherein:

FIG. 3 is a graph plotting converter mount shear strength levels before and after thermal aging, for both honeycomb substrate mount designs employed in the prior art and designs provided in accordance with the invention.

DETAILED DESCRIPTION

A variety of different coating compositions may be applied to the ceramic support structure to provide the insulative coating layer. The particular choice of coating will depend principally on the composition of the support structure and the thermal and mechanical environment of the coating's intended use. Constraints on coating composition and properties generally arise due to the nature of the intended application, with more severe environments requiring careful selection of both the ceramic support and its associated coating in order to achieve the length of service which may be required.

For applications such as automotive preconverters, which are catalytic exhaust gas converters mounted in the exhaust system at locations in close proximity to the engine, particularly severe conditions of temperature and vibration are encountered. Prior attempts to provide a durable mounting system for such converters have included the use of intumescent mounting mats in direct contact with both the substrates and preconverter enclosure, but these have not been entirely successful. When the intumescent mat is in direct contact with the substrate, mat degradation in the form of encrustation or "glazing" begins at substrate temperatures above about 950° C.

Better results have been obtained with "hybrid" mounting systems, which are systems comprising an inner layer of non-intumescent mat disposed between the substrate and the outer layer of intumescent mat. Non-intumescent mat materials having minimal degradation at 1050° C. are known which can insulate the intumescent mat from high temperatures of the substrate. However, multiple-mat mounting systems are undesirably complex, and introduce other problems such as instability of the non-intumescent mat and lowered resistance to "push-out" of the substrate from the hybrid mount structure.

The adherent insulative barrier coatings of the invention are at least as effective as prior art refractory fiber mat coatings in reducing heat transfer from the substrate to the substrate enclosure or to intumescent mat materials lining the enclosure. They are also much more durable, and provide a rigid rather than resilient base against which the exterior intumescent mat layer may more efficiently apply retention pressure. Thus these coatings avoid the problem of fiber mat degradation, and decrease the likelihood of substrate slippage during use.

Figure 1:
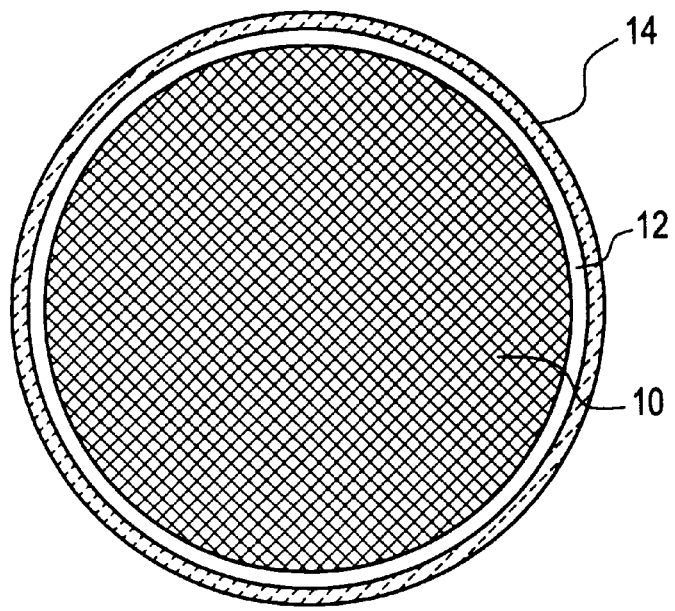
FIG. 1 is a schematic cross-sectional end view of a barrier-coated honeycomb body provided in accordance with the invention.

A schematic illustration of a barrier-coated ceramic honeycomb body provided in accordance with the invention is provided in FIG. 1 of the drawing. In that illustration, consisting of an end elevational view of such a body, the honeycomb substrate comprises a core section 10 made up of a plurality of through channels traversing the core, that section being surrounded by a substrate skin 12 typically composed of the same material as the core or core section. Disposed on and integrally bonded with skin 12 is porous ceramic barrier coating 14.

Other benefits of the insulative barrier coating include the ability to "tailor" the outside shape and/or diameter of the substrate, to repair damaged outer substrate surfaces which might otherwise require part rejection, to improve the crush strength of the substrates, and/or for other purposes related to the performance of the converter. For example, the profile of the barrier coating may be tailored to provide a coated substrate profile with heightened end portions and a recessed central section. This forms a central depression in the coating wherein the intumescent mat layer may be recessed for protection from hot exhaust gases impinging upon the converter end face. In this way the coating provides a partial integral erosion seal against intumescent mat erosion.

Figure 2:
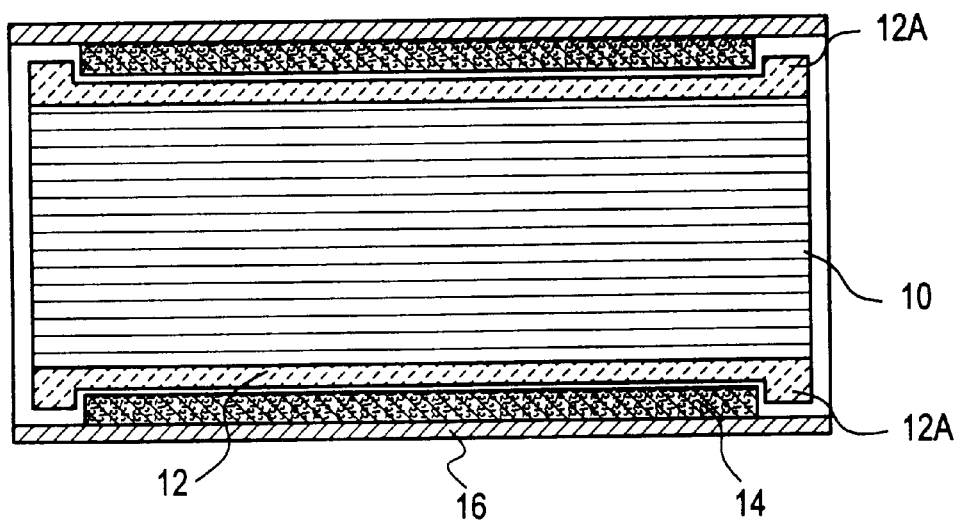
FIG. 2 is a schematic cross-sectional side view of a mount design in accordance with the invention.

FIG. 2 of the drawing schematically illustrates a design for the barrier-coated substrate incorporating such an erosion seal, consisting of a side cross-sectional elevational view of a substrate or core 10 mounted in a steel can or enclosure 16. In that mounting, barrier coating 12 includes heightened end portions 12A which form a central depression into which intumescent mat 14 is recessed. Heightened end portions 12A thus form a partial seal to protect mat 14 from erosion by hot exhaust gases entering can 16 and substrate 10.

Materials useful to form the insulative barrier coatings of the invention generally belong to the class comprising refractory ceramics, i.e., glasses, semicrystallized glasses, and crystalline ceramics. For best thermal insulating characteristics, the selected ceramic will be of relatively low density. It will also be relatively low in thermal expansion to impart good thermal shock resistance to the coated composite, since rapid and substantial changes in substrate temperature are frequently encountered by these composites in use. Thermal cycling can rapidly degrade higher expansion materials, due to differential thermal expansion of the coating.

Particular examples of refractory ceramic formulations for substrate barrier coatings include formulations based on powdered refractory glasses, typically of silicate base, mineral mixtures convertible to low-expansion crystalline ceramic layers upon heat treatment, and crystalline ceramic powders capable of conversion to integral coatings by a sintering heat treatment. For some applications, foam glass compositions such as the known aluminum- and boron-based phosphate foam glasses may be suitable, although the higher expansions and lower strengths of these foams limit their adherence, and could pose durability problems in severe environments such as automotive catalytic preconverters.

To increase the porosity of some of the higher density, lower expansion coating materials employed, oxidizable particulate fillers such as graphite or other carbonaceous additives may be included in the coating formulation, to be later removed by firing to leave a desirable open or closed residual pore structure. For still higher porosity or lower density, blowing agents capable of generating gases within the coating formulation during firing may be used, or hollow fillers including, for example, glass or other ceramic microspheres, could be added to the formulations prior to drying or firing. The latter can reduce density without increasing open porosity, and can also serve to increase the strength of the coating.

A variety of other additives may be considered for incorporation in the barrier coatings depending upon the intended application for the coated honeycomb. The addition of fibrous materials such as refractory glass, ceramic or metal fibers to some of these coating compositions can help to improve coating strength. The fibers will be selected for compatibility with the selected coating composition in terms of thermal expansion, reactivity and/or wetting characteristics; examples of particular fibers which could be used are spun glass fibers or polycrystalline ceramic oxide fibers produced, e.g., by sol-gel processing and subsequent sintering.

The thickness of the barrier coating required will depend on a number of factors, including the thermal environment of intended use, the durability of the intumescent or other mat materials to be used in conjunction with the coating for the substrate mounting, and the density and composition of the coating material selected. In general, coating thicknesses in the range of about 1–4 mm will be adequate for all but the most severe applications.

The application of particulate ceramic materials as coatings to refractory ceramic substrates generally involves combining them with suitable temporary organic, or permanent inorganic, binder/vehicle components, applying them as coatings to the outer surfaces of the substrates, and firing the substrates and coatings together to produce a bonded composite. In some cases surface preparation of the substrates may be useful to secure durable bonding; in other cases adequate bonding and composite durability can be achieved even without a firing step.

The substrates to which the coatings are applied may be pre-fired or unfired ("green"), depending on the compositions of the substrates and coatings. Co-extrusion of the substrate and coating may be a useful approach where an extruded substrates and coating are of compatible composition and the substrate amenable to coating application in the green state.

The following examples illustrate in more detail the preparation and testing of ceramic substrates with durable barrier coatings in accordance with the invention.

EXAMPLE 1
Application of the Barrier Coating

To provide composite substrates for an automotive application involving exposure to relatively high temperatures and significant mechanical vibration, a number of extruded ceramic substrates of cordierite composition are selected for coating. The substrates selected are Celcor® XT cordierite honeycomb substrates of circular cross-section, each having a honeycomb cell density of about 350 cells/inch$^2$ of open frontal area, a length of 89 mm (parallel to the channel or cell direction) and a diameter of 76.2 mm.

Four coating formulations are selected for application to the substrates, these including two formulations consisting mainly of sinterable ceramic (cordierite) powder, and two formulations comprising reactive mixtures of clay, talc, alumina and silica capable of reacting upon firing to form a highly crystalline ceramic (cordierite) material. The particular coatings formulations selected have compositions as reported in Table I below:

TABLE I

| | Coating Formulations | | | |
|---|---|---|---|---|
| | Example No. | | | |
| Coating Constituent | 1 | 2 | 3 | 4 |
| Cordierite powder (um) | 34.2 | 29.1 | | |
| Cordierite powder (um) | 34.2 | 29.1 | | |
| Silicon carbide | | | 15.6 | |
| Talc | | | 33.9 | 33.9 |
| Alumina | | | 18.4 | 18.4 |
| Silica | | | 12.9 | 12.9 |
| Clay | | | 9.4 | 9.4 |
| Sodium stearate | | | 2.5 | 2.5 |
| Methyl cellulose | 0.5 | 0.4 | 1.0 | 1.0 |
| Sodium silicate solution (40%) | | 20.6 | 3.7 | |
| Graphite powder | | | 16.5 | 32 |
| Hydrated alumina | | | 7.7 | 7.7 |
| Water | | 10.5 | 22.1 | 33.0 |

Suitable constituents for the batch materials used in the coatings described in Table I include Carborundum silicon carbide powder, Pfizer 96/68 talc, Alcan C-701 alumina, Ashbury 4740 graphite, Sil-Co-Sil silica powder, K-10 (kaolin) clay, Aluchem AC714K hydrated alumina, A4M methyl cellulose, and cordierite powders produced by crushing and grinding extruded, fired commercial cordierite honeycomb substrates such as hereinafter described.

Coatings 4 mm in thickness of each of the coating formulations reported in Table I above are applied by brushing to the ceramic substrates. For the application of coating formulations 2–4, the substrates are sandblasted, rinsed with deionized water, and oven-dried prior to coating application to enhance the adherence of the coatings to the substrates. For the application of coating formulations 3 and 4, multiple applications of the coating liquid are used to reach the desired 4 mm thickness, with each layer being dried prior to the application of the next layer.

Coating formulations 1 and 2 from Table I, comprising pre-crystallized cordierite and an inorganic sodium silicate binder, do not require any heat treatment to cure the applied coatings. Formulations 3 and 4, which include reactive mineral powders and a graphite burn-out additive for enhanced porosity but no silicate inorganic binder, are cured by means of a further firing step after drying to achieve best results.

A firing process useful for curing reactive coating formulations 3 and 4 from Table I is shown in Table II below:

TABLE II

| | Coating Firing | |
|---|---|---|
| Soak/Ramp | Temperature (° C.) | Duration (hrs.) |
| Soak | Room Temp. | 0 |
| Ramp | 200 | 1 |
| Ramp | 410 | 7 |
| Ramp | 600 | 6 |
| Ramp | 900 | 5 |
| Ramp | 1100 | 4 |
| Ramp | 1350 | 11 |
| Ramp | 1400 | 6 |
| Soak | 1400 | 7 |
| Ramp | 1375 | 1 |
| Ramp | Room Temp. | 13.5 |

This firing treatment is effective to convert the dried clay/talc/alumina/silica coatings of Formulations 3 and 4 to adherent coatings wherein cordierite crystals constitute the predominant crystalline phase.

The coatings applied as above described cover a relatively wide range of thermal expansion and density variation, e.g. density in the range of about 0.5–1.5 g/cm$^3$, thus being useful in a variety of environments including but not being limited to automotive engine exhaust systems. Table III below reports density and thermal expansion results for each of these particular coatings. The thermal expansion values reported in Table III are values representing average thermal expansions over the temperature range from room temperature to 100° C. including both the heating and cooling expansion data.

TABLE III

| | Coating Properties | | | |
|---|---|---|---|---|
| Coated Example # | 1 | 2 | 3 | 4 |
| Bulk Density (g/cm3) | 1.42 | 1.28 | 0.8 | 0.6 |
| Thermal Expansion (× 10$^7$/° C.) | 24 | 20 | 11 | 11 |

Inasmuch as coatings having compositions like those of formulations 1 and 2 from Table I would, in the automotive exhaust system environment, be subjected to temperatures sufficiently high to remove any residual moisture and organics from the dried coatings, preliminary firing to 1080° C. prior to testing is used to remove these materials and adjust coating properties to values more closely approximating those in use. This heating also removes volatiles possibly detrimental to the measurement equipment.

The average thermal expansions of each of these representative coating formulations are somewhat higher than the average thermal expansions of the ceramic honeycomb substrates to which they are applied (approximately 5×10-7/°C. over the same temperature range). Nevertheless, the adherence of these coatings to the substrates is found to be quite adequate.

EXAMPLE 2
Mounting of Coated Substrates

Mounting of the coated substrates produced as above described is carried out using canning methods conventional in the art. In general, these methods involve wrapping intumescent mat about the cylindrical exterior surfaces of the substrates, inserting each of the mat-wrapped substrates into a loose tubular metal enclosure consisting of a cylindrically-preformed steel sheet substantially encircling the mat and substrate, applying tourniquet pressure to the assembly to pre-compress the mat wrapping between the steel sheet and substrate, at the same time closing and overlapping the edges of the steel sheet, and finally fastening the overlapping edges of the steel sheet to maintain the desired level of mat compression between the substrate and closed cylindrical steel shell.

In the case of coated substrates such as provided in accordance with Example 1 above, any coating irregularities can be removed and the outer diameter of the coated substrates adjusted to a pre-selected final dimension by machining of the cured coatings. Machining may be carried out by any suitable means including wet wheel grinding or dry sanding while rotating a coated substrate in a lathe. Using the latter approach, machining of the substrates produced in accordance with Example 1 to final coating thicknesses in the range of about 1.92–3.36 mm provides a desirable coating finish without interfering with the thermal performance of the coatings.

Mat wrapping of these substrates is carried out using conventional intumescent mat, i.e., Series 100 intumescent mat having a mat weight of 3100 g/m$^2$, commercially available from the 3M Company, Minneapolis, Minn. Only a single wrapping layer of this mat is employed.

The mat-wrapped substrates are positioned within cylindrically curved sheet steel enclosures and the enclosures are closed by tourniquet compression to achieve a compressed mat density ("gap bulk density") of about 1.1 g/cm$^3$ in the intumescent mat. This level of compression is selected to achieve good resistance to substrate "push-out" from the enclosures under the exhaust gas pressures commonly encountered in the automotive exhaust environment.

For purposes of comparison, several ceramic honeycomb substrates not provided with barrier coatings are canned using the same canning procedure as employed above for the coated substrate samples. One group of uncoated honeycomb substrates, designated Group A, is provided with a double layer of Series 100 intumescent mat for canning, providing a combined mat weight of 6200 g/m$^2$ between each substrate and its steel enclosure. Tourniquet compression to provide a compressed mat density of about 1.1 g/cm$^3$ is used for this sample group.

A second group of substrates, designated Group B, is provided first with an insulating layer of non-intumescent mat, and then with a single layer of Series 100 intumescent mat. For this group, the non-intumescent mat selected is Fibermax™ refractory fiber mat, commercially available from the Unifrax Company, Niagara Falls, N.Y. and having a mat weight of 800g/m$^2$. Tourniquet shell closure to a mat compression level of 1700 psi is used for canning these samples, since gap bulk density cannot readily be determined for the composite mat structure provided.

As previously noted, the composite or "hybrid" wrapping approach used for canning the Group B substrates is designed to reduce intumescent mat damage from high substrate skin temperatures. Such mat damage can cause intumescent-mat-wrapped substrates like the Group A substrates to undergo reductions in mat compression, increasing the risk of substrate "push-out" after thermal aging in the automobile exhaust system environment.

EXAMPLE 3
Mounted Substrate Performance

Coated substrates provided in accordance with Example 1, after mounting in enclosures in accordance with Example 2, are tested to measure mount characteristics important for performance in automotive exhaust applications. One such characteristic is that of mat temperature during converter operation, most importantly mat temperature at the mat/converter interface where mat temperatures are the highest. A second characteristic is that of resistance to converter "push-out" after aging of the mounted samples in a simulated use environment.

To measure mat/substrate interface temperatures in the mounted converters, thermocouples are positioned at the interfaces in representative samples from each group of canned substrates described in Example 2 during converter assembly. During later testing, each mounted substrate is heated to a typical operating temperature by means of a wound electrical resistance heating element positioned within the cell structure of the honeycomb, and the temperature at the mat/substrate interface is recorded.

For the coated substrates, interface temperatures are determined both at locations of relatively thin barrier coating, e.g., where the coating is only on the order of 2 mm in thickness, as well as at "thick" locations where the coating thicknesses typically approach 3 mm. In the case of uncoated substrate samples, variations in interface temperature are typically due to uneven substrate heating, rather than to any effects of the mat insulation on the temperature measurement.

Table IV below sets forth the results of interface temperature measurements collected from several heated converter samples made as above described. All temperatures reported in Table IV are average temperatures, determined in each case from three or more different locations several measurements typical of each sample configuration.

TABLE IV

Mat Interface Temperatures

| Comparative Examples | | Coated Substrate Examples | |
|---|---|---|---|
| Sample I.D. | T (° C.) | I.D. | Sample T(° C.) | Thin Thick T(° C.) |
| Group A, #1 | 1005 | 1 | 930 | 895 |
| Group A, #2 | 1007 | 2 | 935 | 876 |
| Group B, #1 | 892 | 3 | 913 | 914 |
| Group B, #2 | 873 | 4 | 902 | 911 |

As is apparent from the data reported in Table IV, the interface temperatures for the barrier-coated substrates are significantly lower than for the Group A substrates even in areas of relatively thin barrier coatings. In some cases, the barrier coatings are almost as effective in reducing interface temperatures as the Group B composite mat design, but without the complexity of structure and attendant manufacturing expense.

The capability of a substrate mounting system to resist substrate "push-out" under high exhaust backpressure, particularly after a considerable interval of use in a harsh exhaust environment, if of particular importance. In the laboratory, relative evaluations of this characteristic can be made based on the performance of mounted substrates following accelerated thermal aging. Mounted converters are first subjected to an extended thermal cycling treatment, using the substrate heating arrangement described above for determining mat interface temperatures, and then the force required to move the substrate axially (in the direction of exhaust gas flow) to overcome the axial retention force of the mat mounting at typical converter operating temperatures is measured.

A number of converter assemblies prepared in accordance with Examples 1 and 2 above are subjected to this treatment. Using the electrical resistance heating wire arrangement described above, each converter assembly is heated to 1050° C. and cooled to 100° C. through 5 thermal cycles, each cycle consisting of a 1.5–2 hour heat-up, a 10 hour hold at temperature, and a 1.5–2 hour cool down. The thermally aged assemblies are then subjected to hot push-out shear testing, along with a number of similar unaged samples, to determine the ability of each mounting system to resist the adverse effects of thermal aging on mount characteristics.

To determine the resistance of the converters to backpressure push-out, each sample is placed in an oven maintained at 550° C. and allowed to reach thermal equilibrium. Then, while being maintained at temperature, a load is applied to the substrate in the axial or exhaust gas flow direction, this load being increased until slippage of the substrate against the mat is detected. The load at which the substrate slips is recorded and converted to shear strength in psi., i.e., pounds-force required to move the substrate per square inch of substrate/mat interface area. Lower shear strengths generally reflect more severe mat degradation than higher strengths, and vice versa.

Table V below reports push-out shear strengths recorded in psi. for mounted converter samples provided in accordance with the Examples, both before and after thermal aging. Values reported in Table V for each of the prior art Group A and Group B samples are averages of five sample measurements, while the data for the converters of the Examples are for individual measurements. Data points for sample results reported in Table V are shown in the Drawing, which plots shear strength values computed for each of the different sample types as calculated from the force required to cause axial movement of each mounted substrate within its mounting.

|  | Group # | | Example # | | | |
| --- | --- | --- | --- | --- | --- | --- |
|  | A | B | 1 | 2 | 3 | 4 |
| UnAged | 114 | 53 | 98 | 94 | 105 | 80 |
| Aged | 18 | 35 | 33 | 43 | 63 | 64 |

As is evident from a study of the Drawing and Table V, the prior art Group A mounting, while demonstrating the highest shear strength in the un-aged condition due to the use of a double intumescent mat layer, suffered the largest loss in shear strength during aging. That mounting design also retained the lowest levels of shear strength of any of the mounting designs tested, this performance being attributed to relatively rapid mat deterioration during thermal aging, due to the high substrate/mat interface temperatures encountered.

The prior art Group B samples exhibited significantly improved aged shear strength levels when compared with the Group A samples. This result is attributed to the thermal protection afforded the intumescent mat by the refractory fiber substrate wrapping around the substrate.

Finally, the data suggest a significant further improvement in residual aged shear strength for the Coated Examples of the invention. Those Examples exhibit aged shear strengths substantially higher than the average Group A mounting, and in three of the cases significantly exceed that average. This performance, in combination with the simplifications in mount complexity above described, provide a substantial advance in the art of durable substrate mounting for automotive and other high temperature process stream applications.

We claim:

1. A unitary, thermal-barrier-coated, ceramic honeycomb body which comprises:

a low expansion ceramic honeycomb support incorporating a plurality of through-channels bounded by an external skin; and an insulating porous refractory thermal barrier coating disposed on and bonded to at least a portion of the external skin;

the coating having a porosity and thickness at least sufficient to provide an outer barrier coating surface temperature at least about 50° C. below the skin temperature.

2. A honeycomb body in accordance with claim 1 wherein the barrier coating is composed of a refractory ceramic selected from the group consisting of glasses, semicrystallized glasses, and crystalline ceramics.

3. A honeycomb body in accordance with claim 2 wherein the refractory ceramic is formed from a material selected from the group consisting of powdered refractory glasses, mineral mixtures, crystalline ceramic powders and foam glasses.

4. A honeycomb body in accordance with claim 3 wherein the material used to form the refractory ceramic comprises a pore-forming agent selected from the group consisting of oxidizable particulate fillers, ceramic blowing agents, and glass or ceramic microspheres.

5. A honeycomb body in accordance with claim 2 wherein the barrier coating comprises a fiber reinforcement phase.

6. A honeycomb body in accordance with claim 2 wherein the refractory ceramic is provided from a formulation selected from the group consisting of sincerable cordierite powder and reactive mixtures capable of interacting to form cordierite on firing.

7. A honeycomb body in accordance with claim 1 wherein the coating has a thickness in the range of about 1–4 mm and a density in the range of about 0.5–1.5 g/cm$^3$.

8. A mounted catalyst support assembly comprising:

a ceramic honeycomb body incorporating a plurality of through-channels bounded by an external skin;

an insulating porous refractory thermal barrier coating disposed on and bonded to at least a portion of the external skin; the coating having a porosity and thickness at least sufficient to provide an outer barrier coating surface temperature at least about 50°C. below the skin temperature;

an enclosure incorporating a metal wall element for encasing and supporting the ceramic honeycomb body within the enclosure; and a layer of fiber support material disposed between at least a portion of the insulating porous refractory coating and the metal wall element.

9. An assembly in accordance with claim 8 wherein the layer of fiber support material is an intumescent fiber mat layer.

10. An assembly in accordance with claim 9 wherein the thermal barrier coating incorporates a recessed portion and wherein the intumescent fiber mat layer is at least partly disposed in the recessed portion.

* * * * *

UNITED STATES PATENT AND TRADEMARK OFFICE
CERTIFICATE OF CORRECTION

PATENT NO. : 6,077,483
DATED : June 20, 2000
INVENTOR(S) : Locker et al.

Page 1 of 1

It is certified that error appears in the above-identified patent and that said Letters Patent is hereby corrected as shown below:

Column 6,
Line 52, "100°C" should be -- 1000°C --

Column 9,
Line 56, the title of the table is missing, it should be -- TABLE V-Mount Shear Strength (psi) --

Column 10,
Line 54, claim 6, "sincerable" should be -- sinterable --

Signed and Sealed this

Eighteenth Day of September, 2001

Attest:

NICHOLAS P. GODICI
*Attesting Officer*    *Acting Director of the United States Patent and Trademark Office*